United States Patent
Sreeramoju

(10) Patent No.: US 10,097,462 B2
(45) Date of Patent: Oct. 9, 2018

(54) THROUGHPUT RESILIENCE DURING LINK FAILOVER

(71) Applicant: NICIRA, INC., Palo Alto, CA (US)

(72) Inventor: Akshay Kumar Sreeramoju, Hyderabad (IN)

(73) Assignee: Niciria, Inc., Palo Alto, CA (US)

( * ) Notice: Subject to any disclaimer, the term of this patent is extended or adjusted under 35 U.S.C. 154(b) by 108 days.

(21) Appl. No.: 15/242,486

(22) Filed: Aug. 20, 2016

(65) Prior Publication Data

US 2017/0289040 A1 Oct. 5, 2017

(30) Foreign Application Priority Data

Apr. 2, 2016 (IN) .............................. 201641011717

(51) Int. Cl.
  *H04L 12/24* (2006.01)
  *H04L 12/801* (2013.01)
  *H04L 12/707* (2013.01)

(52) U.S. Cl.
  CPC .......... *H04L 47/12* (2013.01); *H04L 41/0654* (2013.01); *H04L 45/22* (2013.01)

(58) Field of Classification Search
  CPC ..... H04L 47/12; H04L 41/0654; H04L 45/22; H04L 49/70; H04L 49/25; H04L 41/0806; H04L 47/10; G06F 9/45558
  See application file for complete search history.

(56) References Cited

U.S. PATENT DOCUMENTS

| | | | | |
|---|---|---|---|---|
| 6,757,248 B1* | 6/2004 | Li | ............... | H04L 1/1858 370/235 |
| 6,975,591 B1* | 12/2005 | Shorey | ............... | H04L 1/0002 370/229 |
| 7,701,866 B2* | 4/2010 | Ludwig | ............... | H04L 1/1809 370/252 |
| 8,886,831 B2* | 11/2014 | Tirumalai | ............... | H04L 45/22 370/218 |
| 9,450,700 B1* | 9/2016 | Van Tonder | ............... | H04L 41/046 |
| 9,838,318 B2* | 12/2017 | Wang | ............... | H04L 47/193 |
| 2002/0150048 A1* | 10/2002 | Ha | ............... | H04L 1/1887 370/231 |
| 2004/0122969 A1* | 6/2004 | Ameigeiras | ............... | H04L 1/1854 709/235 |
| 2008/0037420 A1* | 2/2008 | Tang | ............... | H04L 1/1607 370/229 |

(Continued)

*Primary Examiner* — Wutchung Chu
(74) *Attorney, Agent, or Firm* — Patterson & Sheridan LLP

(57) ABSTRACT

Techniques disclosed herein provide an approach for providing throughput resilience during link failover when links are aggregated in a link aggregation group (LAG). In one embodiment, failure of a link in the LAG may be detected, and a Transmission Control Protocol/Interact Protocol (TCP/IP) stack notified to ignore packet losses and not perform network congestion avoidance procedure(s) for one round-trip timeout (RTO) period. In a virtualized system in particular, a virtual switch may be configured to generate events in response to detected link failures and notify TCP/IP stacks of a hypervisor and/or virtual machines (VMs) of the link failures. In turn, the notified TCP/IP stacks of the hypervisor and/or VMs may ignore packet losses and not perform network congestion avoidance procedure(s) for one RTO period.

20 Claims, 4 Drawing Sheets

(56) References Cited

U.S. PATENT DOCUMENTS

| | | | |
|---|---|---|---|
| 2013/0318246 A1* | 11/2013 | Kuriakose | H04L 29/08576 |
| | | | 709/227 |
| 2014/0115182 A1* | 4/2014 | Sabaa | H04L 67/1097 |
| | | | 709/232 |
| 2014/0304425 A1* | 10/2014 | Taneja | H04L 47/12 |
| | | | 709/235 |
| 2015/0009817 A1* | 1/2015 | Sato | H04L 47/193 |
| | | | 370/230.1 |
| 2016/0020939 A1* | 1/2016 | Ramasubramanian | |
| | | | H04L 41/0654 |
| | | | 370/217 |
| 2017/0019338 A1* | 1/2017 | Song | H04L 47/225 |
| 2017/0195231 A1* | 7/2017 | Lopez Serrano | H04L 47/122 |
| 2017/0208498 A1* | 7/2017 | Lee | H04W 24/04 |

\* cited by examiner

THROUGHPUT RESILIENCE DURING LINK FAILOVER

RELATED APPLICATION

Benefit is claimed under 35 U.S.C. 119(a)-(d) to Foreign Application Serial No. 201641011717 filed in India entitled "THROUGHPUT RESILIENCE DURING LINK FAILOVER", filed on Apr. 2, 2016, by Nicira, Inc., which is herein incorporated in its entirely by reference for all purposes.

BACKGROUND

In both physical and virtualized computer systems, multiple network connections can be aggregated to provide aggregated network capacity and failover facilities to downstream applications and nodes. Such an aggregation of network connections is commonly referred to as link aggregation, link bundling, network interface controller (NIC) teaming, and NIC bonding. When one of the aggregated links goes down, failover can be achieved by transferring flows from the failed link to one or more other links that are still active. However, in such a case, any packets in the failed link (e.g., in a failed NIC's memory) are lost. Transmission Control Protocol (TCP) assumes that such lost packets, which are identified by either the lack of an acknowledged by the receiving end resulting in a round trip timeout or three duplicate TCP acknowledgments, are caused by network congestion. To reduce such "congestion," congestion avoidance algorithms are employed, including switching to a congestion avoidance mode in which congestion control windows (cwnd) maintained by TCP for flows associated with the failed link are reduced in size. However, as the packets were actually lost due to link failure rather than network congestion, reducing the size of congestion control windows unnecessarily reduces throughput and results in suboptimal performance, which could be disastrous for bandwidth intense and time-constrained applications. This is especially the case in high latency environments, as the flows in congestion avoidance mode may rediscover the optimal bandwidth at a slow pace.

SUMMARY

One embodiment provides a method for providing throughput resilience during link failover. The method generally includes determining that a link in an aggregation of links has failed, wherein packet flows on the failed link are transferred to one or more other links in the aggregation of links that are active. The method further includes notifying a protocol layer originating the packet flows that the link failed, and disabling network congestion avoidance procedure(s) by the protocol layer on the packet flows for a predefined period of time.

Further embodiments include a non-transitory computer-readable storage medium storing instructions that when executed by a computer system cause the computer system to perform the method set forth above, and a computer system programmed to carry out the method set forth above.

DETAILED DESCRIPTION

Embodiments presented herein provide techniques for notifying a Transmission Control Protocol/Internet Protocol (TCP/IP) stack to ignore packet losses and not performing network congestion avoidance procedure(s) for one round trip timeout (RTO) period, when failure of a link in a link aggregation group (LAG) formed by link aggregation is detected. Link failure may generally include failure of the local network interface controller (NIC), failure of the remote NIC, or the path via the NIC being downed (which may be locally detected via e.g., STP or Link Agg protocols). TCP/IP generally assumes that detected packet losses result from network congestion and employs congestion avoidance procedure(s) in response thereto, even when the packet losses actually result from failure of a link in a LAG. The network congestion avoidance procedure(s) typically include switching to a congestion avoidance mode in which congestion control windows (cwnd) maintained by TCP are reduced in size, causing throughput to drop and suboptimal performance. In one embodiment, failure of link in a LAG may be detected, and the TCP/IP stack notified to ignore packet losses and not perform network congestion avoidance procedures) for one round-trip timeout (RTO) period. In a virtualized system in particular, a virtual switch may be configured to generate events in response to detected link failures and notify TCP/IP stacks of a hypervisor and/or virtual machines (VMs) of the link failures. In turn, the notified TCP/IP stacks of the hypervisor and/or VMs may ignore packet losses and not perform network congestion avoidance procedure(s) for the one RTO period.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
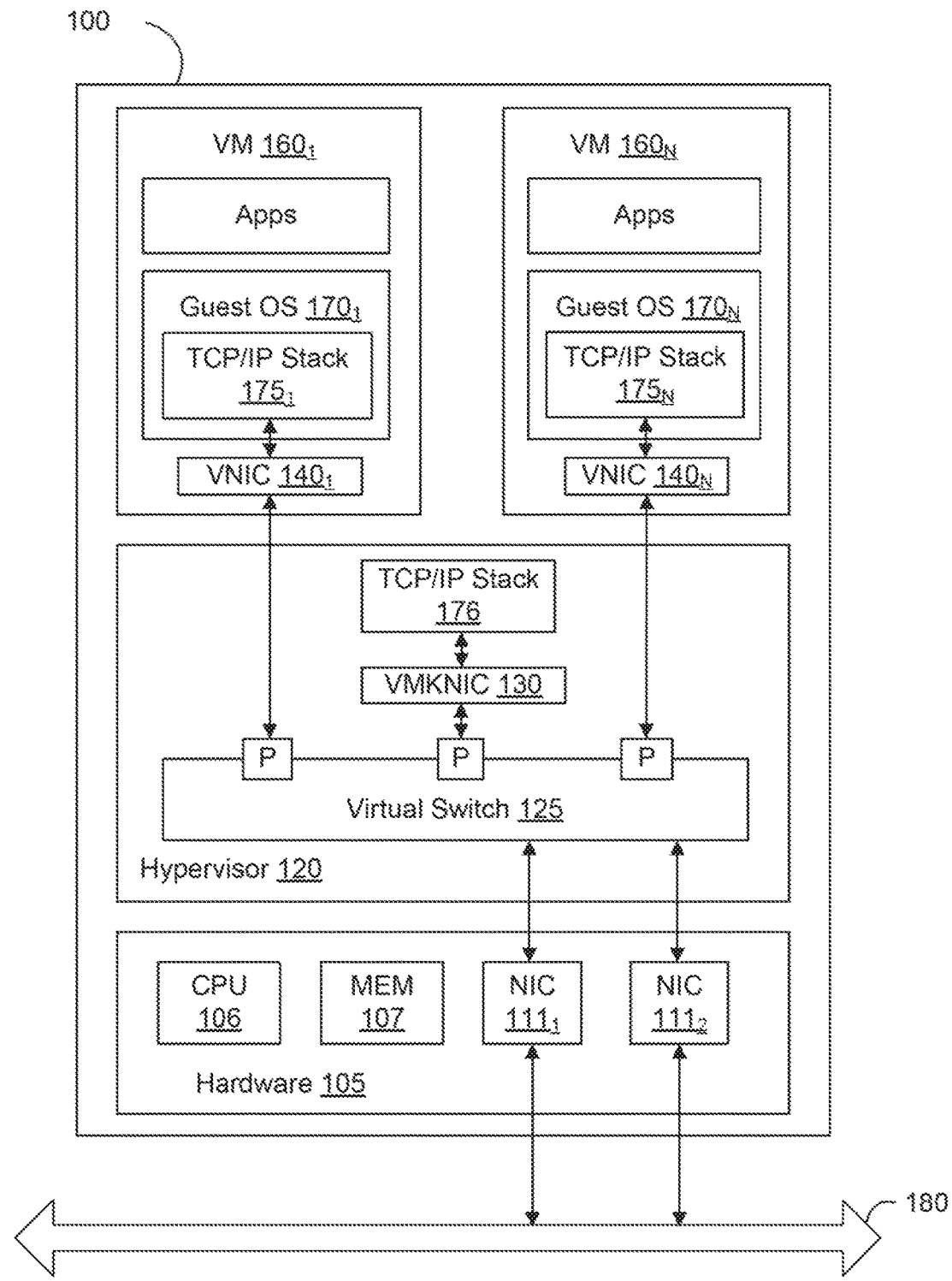
FIG. 1 illustrates components of a virtualized computer system in which one embodiment may be implemented.

FIG. 1 illustrates components of a virtualized computer system 100 in which one embodiment may be implemented. As shown, vandalized system 100 is a host server configured to deliver virtualization-based distributed services to information technology environments. Host server 100 may be constructed on a conventional hardware platform. Illustratively, server hardware 105 includes a central processing unit (CPU) 106 that retrieves and executes programming instructions stored in a memory 107 and also stores and retrieves application data residing in memory 107. Hardware 105 further includes NICs $111_{1-2}$ connecting server 100 to a network 108, such as a wide area network (e.g., the Internet) or a local area network, and the NICs $111_{1-2}$ may be connected to the network via a switch (not shown). Although two NICs $111_{1-2}$ are shown, it should be understood that host server 100 may include any number of NICs. In addition, server hardware 105 may include an I/O device interface (not shown) connecting I/O devices (e.g., keyboard, display and mouse devices) to server 100.

A visualization layer (hypervisor 120) runs in host server 100 and abstracts processor, memory, storage, and/or networking resources into multiple virtual machines (e.g., VMs $160_{1-N}$) that run side-by-side on the same physical host sewer 100. That is, hypervisor 120 partitions host server 100 into multiple secure and portable virtual machines that run on the same physical server. Each of VMs $160_{1-N}$ represents a complete system—with processors, memory, networking, storage, and/or BIOS. Each of VMs $160_{1-N}$ also includes a software-based virtual network adapter (VNICs $140_{1-N}$) connected to a virtual switch 125 provided by hypervisor 120. One or more physical network adapters (e.g., NICs $111_{1-2}$) also connect to virtual switch 125. Although a single VNIC is shown for each of VMs $160_{1-N}$, it should be understood that each VM may also include multiple VNICs.

A guest operating system (OS) $170_{1-N}$ executes in each of VMs $160_{1-N}$, and each guest OS $170_{1-N}$ includes a respective TCP/IP stack $175_{1-N}$, which may be any feasible TCP/IP stack, such as a Linux® TCP/IP stack. Each of TCP/IP stacks $175_{1-N}$ uses a corresponding VNIC $140_{1-N}$ (or multiple such VNICs) to send packets to and receive packets from virtual switch 125. Similarly, hypervisor 120 itself includes a TCP/IP stack 176 that uses a virtual NIC (shown as VMKNIC 130) to send packets to and receive packets from virtual switch 125. Although TCP/IP stacks $175_{1-N}$ and 176 are shown, it should be understood that techniques disclosed are generally applicable to any protocol layer, including HTCP/GTCP and the standard TCP. Although shown as being in guest OS $170_{1-N}$ and hypervisor 120, it should be understood that processing of TCP/IP stacks $175_{1-N}$ and 176 may also be offloaded to VNICs $140_{1-N}$ and VMKNIC 130, respectively.

In one embodiment, TCP/IP stacks $175_{1-N}$ and 176 may each include a socket layer, a TCP layer, an IP layer, and an interface layer, although any feasible TCP/IP stack may be employed. Generally, the header of an upper layer is appended to the packet when data is passed from the upper layer to a lower layer in a TCP/IP stack, and the header of the lower layer is stripped off when data is passed from the lower layer to an upper layer. The socket layer of a TCP/IP stack may provide an interface between applications and lower layers of the TCP/IP stack in the operating system kernel, with a socket being created for each connection that is established. The TCP and IP layers may implement the TCP and IP protocols, respectively. The interface layer may include a network device driver that sends outgoing packets from the IP layer to the VNIC (or VMKNIC) and hands incoming packets from the VNIC (or VMKNIC) to the IP layer.

Virtual switch 125 is a software-based switch acting as a layer 2 (L2) forwarding engine and performing VLAN tagging, stripping, filtering, L2 security, checksum, segmentation offload units, and other tasks typically performed by physical switches. Virtual switch 125 may include uplink ports (labeled as "P") which connect to physical network adapters (e.g., NICs $111_{1-2}$), as well as VM ports which connect to virtual network adapters (e.g., VNICs $140_{1-N}$ and VMKNIC 130) and provide connections for hypervisor 120 and VMs $160_{1-N}$. In one embodiment, virtual switch 125 may be part of a distributed virtual switch that is an abstraction of a switch across multiple host servers and permits virtual switches on the multiple host servers to be managed as if ports of those virtual switches belonged to a single switch, the distributed virtual switch.

Virtual switch 125 is configured to manage link aggregation, in which multiple network connections are combined to provide aggregated network capacity, load balancing, and failover protection. Various link aggregation and failover policies may be implemented. For example, virtual switch 125 may perform a four-tuple bash on the source IP, destination IP, source port, and destination port of outgoing traffic from VNICs $140_{1-N}$ and VMKNIC 130, and, based on said hash, virtual switch 125 may select one of the links in a LAG to send the traffic on. As a result, outgoing flows may be distributed across links in the LAG. Additionally, if one of the links fails, the hash may be mapped to other links in the LAG that are still active, thereby providing link failover.

When a link in a LAG fails, packets put in the down link's queue for transmission are lost. Such lost packets may be identified by either the lack of an acknowledged by the receiving end resulting in a round trip timeout or receiving three duplicate TCP acknowledgments. Upon identifying such lost packets, traditional TCP assumes the packet loss is caused by network congestion and switches to a congestion avoidance mode in which congestion control windows (cwnd) maintained for the flows are reduced in size, causing throughput to drop and resulting in suboptimal performance. This is undesirable, as a link failure in a LAG with failover/load-balancing need not necessarily lead to congestion in the connection, so congestion avoidance may be unnecessary. In one embodiment, in order to avoid such a reduction of the congestion control windows, virtual switch 125 may be configured to notify the TCP/IP stacks which are sending the flows that the link is down. In turn, the TCP/IP stacks may each establish a link-down window in which network congestion avoidance procedure(s) are not performed for outbound traffic affected by the link failure for one RTO period.

Figure 2:
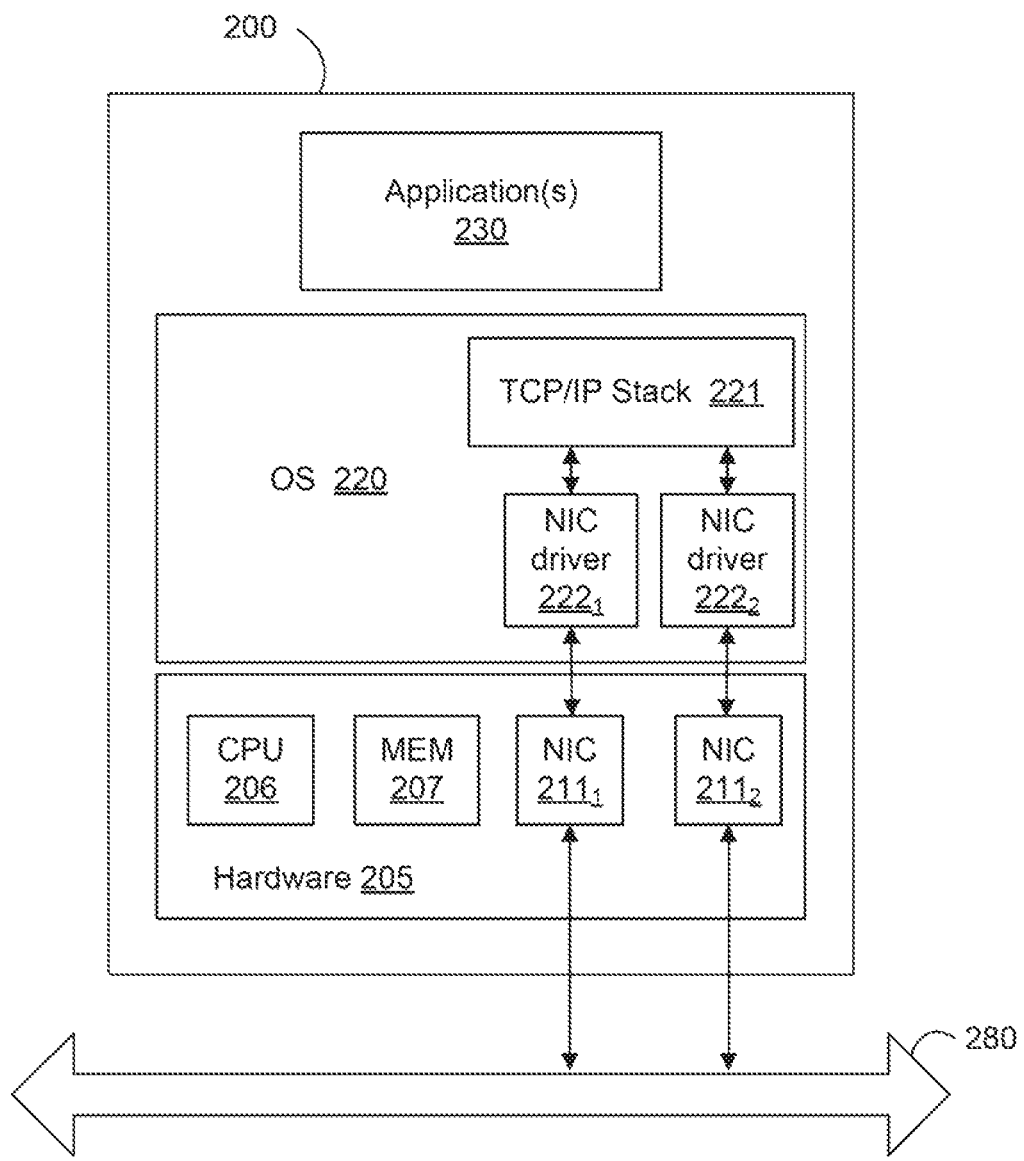
FIG. 2 illustrates components of a computer system in which an alternative embodiment may be implemented.

FIG. 2 illustrates components of a computer system 200 in which an alternative embodiment may be implemented. As shown, system 200 is a server computer that may be constructed on a conventional hardware platform. A server is used herein as an example of a computer, but it should be understood that techniques disclosed herein are also applicable to other types of computers. Similar to hardware 105 of virtualized system 100, hardware 205 of server 200 includes a CPU 206, a memory 207, NICs $211_{1-2}$ connecting server 200 to a network 280, and an I/O device interface (not shown) connecting I/O devices (e.g., keyboard, display and mouse devices) to server 200. Although two NICs $211_{1-2}$ are shown, it should be understood that server 200 may include any number of NICs. As shown, an OS 220 is executed in server 200, and application(s) 230 run on OS 220. OS 220 may be any feasible operating system, and Linux® is once again taken as an example. OS 220 includes a TCP/IP stack 221, such as the Linux® TCP/IP stack, and TCP/IP stack 211 may be similar to TCP/IP stacks $175_{1-N}$ and 176, discussed above. Further, as previously discussed, techniques disclosed herein are generally applicable to any protocol layer, including HTCP/GTCP and the standard TCP.

Similar to the virtualized system 100, NICs $211_{1-2}$ of server 200 may be aggregated through link aggregation for improved network capacity, load balancing, aid failover protection. Further, when a link in a LAG goes down and packets in the down link's queue are lost, TCP/IP stack 221 would traditionally assume the packet loss is caused by network congestion and switch to a congestion avoidance mode in which congestion control windows (cwnd) maintained for flows associated with the down link are reduced in size, causing throughput to drop and resulting in suboptimal performance. In one embodiment, in order to avoid such a reduction of the congestion control windows, NIC drivers (e.g., NIC drivers $222_{1-2}$) may be configured to notify TCP/IP stacks which are sending the flows that the associated links are down. In turn, the TCP/IP stacks may each establish a link-down window in which network congestion avoidance procedure(s) are not performed for outbound traffic affected by the link failure for one RTO period.

Figure 3:
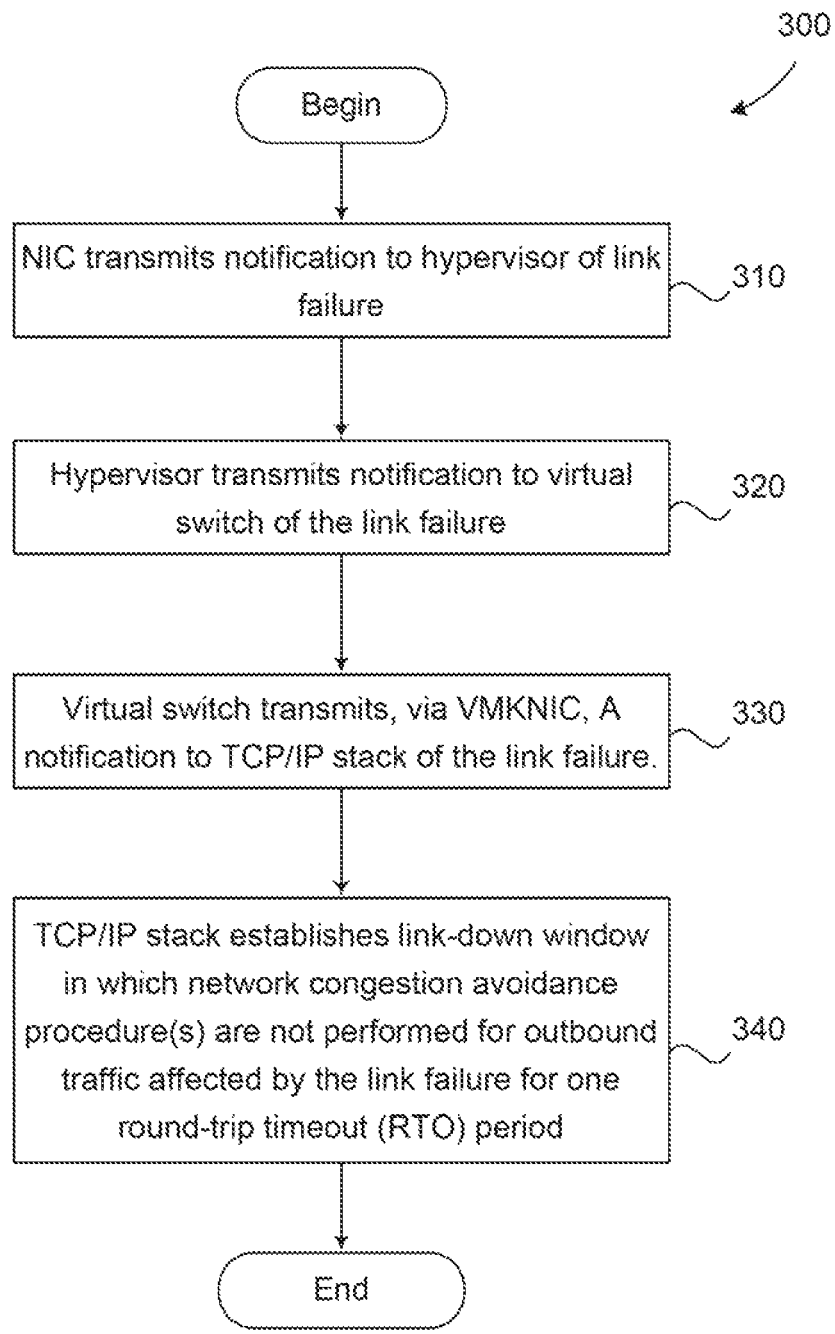
FIG. 3 illustrates a method for providing throughput resilience during link failover, according to an embodiment.

FIG. 3 illustrates a method 300 for providing throughput resilience during link failover, according to an embodiment. Method 300 is described with respect to virtualized system 100 and assumes that NICs $111_{1-2}$ have been added to a LAG maintained by virtual switch 125. As shown, method 300 begins at step 310, where NIC $111_1$ or $111_2$ transmits a notification to hypervisor 120 of a failure of a link. A link may generally be physically down, administratively down, or experience a protocol shutdown. In a physical down, which is used herein to refer to unexpected failures of the hardware, software, or network, such as the cable connected to a NIC being unplugged, hardware of the NIC may generate a corresponding event that is then captured by the NIC's driver and delivered to hypervisor 120. Alternatively, a link may be administratively down, which is used herein to refer to expected failures such as a user configuring the link state to be down. For example, such a configuration may be made through hypervisor 120. Hypervisor 120 may then be notified by a NIC driver when the link goes down. A protocol shutdown may include STP, LACP driven shutdowns or adjustments, and may similarly result in hypervisor 120 being notified that the link is down.

At step 320, hypervisor 120 transmits a notification to virtual switch 125 of the same link failure that hypervisor 120 was notified about at step 310. Then, at step 330, virtual switch 125 transmits, via VNICs $140_{1-N}$ and/or VMKNIC 130, a notification of the failed link to TCP/IP stack $175_{1-N}$ and/or TCP/IP stack 176 whose flows are affected by the link failure. In one embodiment, virtual switch 125 may generate an event indicating that the link is down, and TCP/IP stack $175_{1-N}$ and/or TCP/IP stack 176 may receive notification of such an event. It should be understood that the notifications at steps 310-330 may be implemented using any feasible notification framework.

At step 340, TCP/IP stack $175_{1-N}$ and/or TCP/IP stack 176 that receives the notification at step 330 each establishes a link-down window in which network congestion avoidance procedure(s) are not performed for outbound traffic affected by the link failure for one RTO period. That is, the event indicating the link failure that is generated by virtual switch 125 is consumed by TCP/IP stack $175_{1-N}$ and/or TCP/IP stack 176, which, in response to the event, each initialize a timer which keeps track of a period of one RTO during which network congestion avoidance procedure(s) are not performed.

As discussed, packets which are lost from the failed link will be detected as lost after one RTO period based on lack of acknowledgement packets, or will be detected after one round trip time (RTT) based on duplicate acknowledgement packets. In one embodiment, TCP/IP stack $175_{1-N}$ and/or TCP/IP stack 176 may then ignore packet losses by not performing network congestion avoidance procedure(s) for the next RTO period. An RTO is greater than or equal to an RTT. As a result, the link-down window may in theory be started from immediately one RTT after the link-down notification to one RTO after the link-down window. However, RTT and RTO are not fixed values and continuously change based on the observed RTT. As a result, in one embodiment, the RTO may simply be started when the link-down notification is received and last for one RTO. It should be understood that link failure is uncommon, so ignoring packet losses that could in fact be indicative of network congestion for one RTO period does not affect standard TCP friendliness measurably. In another embodiment, the link-down window may be configurable by a user, who may, e.g., set the link-down window to be greater than one RTO period. Although discussed herein with respect to RTO periods, it will be understood that RTO is a multiple of RTT, and the link-down window may also be expressed in terms of RTT.

After the link-down window period, TCP/IP stack $175_{1-N}$ and/or TCP/IP stack 176 may handle packet losses normally by performing network congestion avoidance procedure(s) such as reducing the size of congestion control windows (cwnd) for the appropriate flows. In addition, should the down link become active again within the link-down window, the link may be added as a new link to the LAG, and the outgoing traffic rebalanced to the new link. Such an addition of the link to the LAG will not affect the ignoring of packet losses in the link-down window established at step 340.

Figure 4:
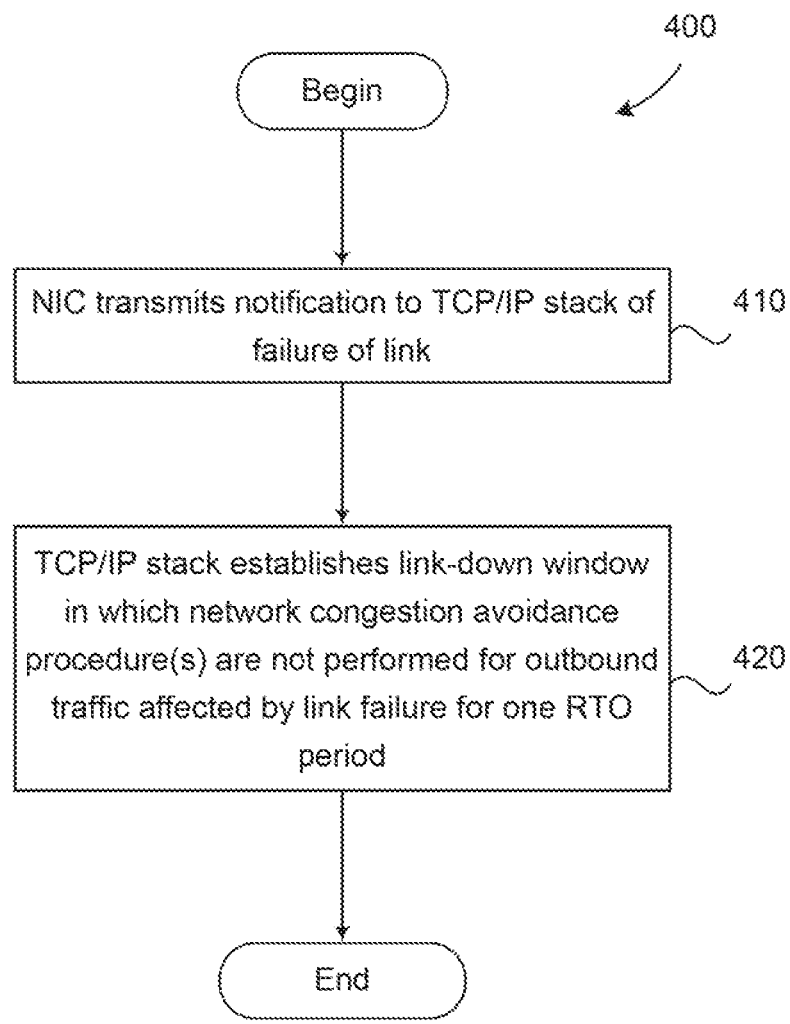
FIG. 4 illustrates a method for providing throughput resilience during link failover, according to an alternative embodiment.

FIG. 4 illustrates a method 400 for providing throughput resilience during link failover, according to an alternative embodiment. Method 400 is described with respect to system 200 and assumes that NICs $211_{1-2}$ have been added to a LAG. As shown, method 400 begins at step 410, where NIC $211_1$ or $211_2$ transmits a notification to TCP/IP stack 221 of a failure of a link. The notification of link failure may be implemented using any feasible notification framework. As discussed, when a link goes down physically, the NIC may generate a corresponding event that is then captured by the NIC's driver, which may in turn notify TCP/IP stack 221 of the link down event. Alternatively, a link may be brought down administratively by a user who configures the link state to be down or the link may experience a protocol shutdown, and the NIC driver may in turn notify TCP/IP stack 221 that the link is down.

At step 420, TCP/IP stack 221 establishes a link-down window in which network congestion avoidance procedure(s) are not performed for outbound traffic affected by the link failure for one round-trip timeout (RTO) period. Similar to the discussion above with respect to step 340 of method 300, packets which are lost from the failed link's buffer will be detected as lost after one RTO based on lack of acknowledgment packets, or in response to three duplicate TCP acknowledgements after one RTT. In one embodiment, TCP/IP stack 221 may ignore packet losses by not performing network congestion avoidance procedure(s) for the next RTO period after the packet loss is detected that resulted from the link failure. In another embodiment, TCP/IP stack 221 may not perform the network congestion avoidance procedure(s) for more than one RTO period (i.e., one RTO plus) based on a user-configured link-down window to account for variations in round trip times.

Similar to the discussion above with respect to method 300, after the link-down window during which packet losses are ignored and network congestion avoidance procedure(s) are not performed, TCP/IP stack 221 may handle packet losses normally by performing network congestion avoidance procedure(s) such as reducing the size of congestion control windows (cwnd). Further, if the down link becomes active again within the link-down window, the link may be added as a new link to the LAG, and the outgoing traffic rebalanced to the new link.

Advantageously, techniques disclosed herein notify a TCP/IP stack to ignore packet losses and avoid performing network congestion avoidance procedure(s) for one RTO period, when the failure of a link in a LAG causes the packet losses. That is, in the context of link aggregation, link failures may be identified and the TCP/IP stack notified to not perform network congestion avoidance procedure(s) so as to avoid reducing the size of congestion control windows which would cause throughput to drop and result in suboptimal performance and be particularly detrimental to bandwidth intense and time-constrained applications and applications in high latency environments, where the optimal bandwidth is rediscovered slowly. As a result, techniques disclosed herein permit established-flows to sustain their throughput during failovers.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated front each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for providing throughput resilience during link failover, comprising:
   determining by a protocol layer originating at least one packet flow on a link in an aggregation of links that the link has failed, wherein the at least one packet flow on the failed link is transferred to one or more other links in the aggregation of links that are active; and
   disabling one or more network congestion avoidance procedures that reduce throughput of the at least one packet flow by the protocol layer on the at least one packet flow for a period of time by causing the one or more network congestion avoidance procedures to ignore packet losses of the at least one packet flow during the period of time.

2. The method of claim 1, wherein the period of time is one round-trip timeout (RTO) period.

3. The method of claim 2, wherein the one or more network congestion avoidance procedures are disabled for the one RTO period beginning from when the link failure is determined.

4. The method of claim 2, wherein the period of time is user-configurable.

5. The method of claim 1, wherein the disabled one or more network congestion avoidance procedures include a congestion avoidance mode in which congestion control windows (cwnd) maintained for flows associated with the failed link are reduced in size.

6. The method of claim 1, wherein links in the aggregation of links are connected to a virtual switch, and wherein the protocol layer is in a hypervisor or in a guest operating system (OS) running in a virtual machine (VM).

7. The method of claim 6, wherein determining the link in the aggregation of links has failed includes:
   receiving, by the protocol layer, from a virtual network interface controller (VNIC), a first notification of the failed link, wherein the VNIC transmits the first notification in response to receiving a second notification from the virtual switch of the failed link, and wherein the virtual switch transmits the second notification in response to receiving a third notification from the hypervisor of the failed link.

8. The method of claim 1, wherein the determining that the link in the aggregation of links has failed includes receiving, from a network interface controller (NIC) driver, a notification of the failure.

9. The method of claim 1, wherein, after the period of time, one or more TCP/IP network congestion avoidance procedures are performed.

10. A non-transitory computer-readable storage medium containing a program which, when executed by one or more processors, performs operations for providing throughput resilience during link failover, the operations comprising:
    determining by a protocol layer originating at least one packet flow on a link in an aggregation of links that the link has failed, wherein the at least one packet flow on the failed link is transferred to one or more other links in the aggregation of links that are active; and
    disabling one or more network congestion avoidance procedures that reduce throughput of the at least one packet flow by the protocol layer on the at least one packet flow for a period of time by causing the one or more network congestion avoidance procedures to ignore packet losses of the at least one packet flow during the period of time.

11. The non-transitory computer-readable storage medium of claim 10, wherein the period of time is one round-trip timeout (RTO) period.

12. The non-transitory computer-readable storage medium of claim 11, wherein the one or more network congestion avoidance procedures are disabled for the one RTO period beginning from when the link failure is determined.

13. The non-transitory computer-readable storage medium of claim 11, wherein the period of time is user-configurable.

14. The non-transitory computer-readable storage medium of claim 10, wherein the disabled one or more network congestion avoidance procedures include a congestion avoidance mode in which congestion control windows (cwnd) maintained for flows associated with the failed link are reduced in size.

15. The non-transitory computer-readable storage medium of claim 10, wherein links in the aggregation of links are connected to a virtual switch, and wherein the protocol layer is in a hypervisor or in a guest operating system (OS) running in a virtual machine (VM).

16. The non-transitory computer-readable storage medium of claim 15, wherein determining the link in the aggregation of links has failed includes:
    receiving, by the protocol layer, from a virtual network interface controller (VNIC), a first notification of the failed link, wherein the VNIC transmits the first notification in response to receiving a second notification from the virtual switch of the failed link, and wherein the virtual switch transmits the second notification in response to receiving a third notification from the hypervisor of the failed link.

17. The non-transitory computer-readable storage medium of claim 10, wherein the determining that the link in the aggregation of links has failed includes receiving, from a network interface controller (NIC) driver, a notification of the failure.

18. The non-transitory computer-readable storage medium of claim 10, wherein, after the period of time, one or more TCP/IP network congestion avoidance procedures are performed.

19. A system, comprising:
    a processor;
    a plurality of network interface controllers (NICs), wherein the NICs are grouped together in an aggregation of links; and
    a memory, wherein the memory includes a program executable in the processor to perform operations for providing throughput resilience during link failover, the operations comprising:
    determining by a protocol layer originating at least one packet flow on a link in the aggregation of links that the link has failed, wherein the at least one packet flow on the failed link is transferred to one or more other links in the aggregation of links that are active; and
    disabling one or more network congestion avoidance procedures that reduce throughput of the at least one packet flow by the protocol layer on the at least one packet flow for a period of time by causing the one or more network congestion avoidance procedures to ignore packet losses of the at least one packet flow during the period of time.

20. The system of claim 19, wherein the period of time is one round-trip timeout (RTO) period beginning from when the link failure is determined.

* * * * *